United States Patent
Fung et al.

(10) Patent No.: US 12,375,223 B2
(45) Date of Patent: Jul. 29, 2025

(54) AUTOMATIC RESENDING OF WUP BY SLAVE DEVICE

(71) Applicant: Marvell Asia Pte Ltd, Singapore (SG)

(72) Inventors: Hon Wai Fung, Newark, CA (US); Dance Wu, Palo Alto, CA (US); Liang Zhu, Shanghai (CN)

(73) Assignee: MARVELL ASIA PTE LTD, Singapore (SG)

(*) Notice: Subject to any disclaimer, the term of this patent is extended or adjusted under 35 U.S.C. 154(b) by 551 days.

(21) Appl. No.: 17/658,195

(22) Filed: Apr. 6, 2022

(65) Prior Publication Data

US 2022/0329358 A1 Oct. 13, 2022

Related U.S. Application Data

(60) Provisional application No. 63/172,080, filed on Apr. 7, 2021.

(51) Int. Cl.
| | |
|---|---|
| *H04L 1/18* | (2023.01) |
| *G06F 1/3209* | (2019.01) |
| *H04L 1/1867* | (2023.01) |
| *H04L 12/12* | (2006.01) |

(52) U.S. Cl.
CPC ............ *H04L 1/188* (2013.01); *G06F 1/3209* (2013.01); *H04L 12/12* (2013.01)

(58) Field of Classification Search
CPC .. G06F 1/3209; G06F 1/3278; H04W 52/028; H04W 52/0229; H04L 12/12; H04L 1/188; H04L 2012/40273; H04L 2012/4026; H04L 12/40; Y02D 30/70
See application file for complete search history.

(56) References Cited

U.S. PATENT DOCUMENTS

| | | | |
|---|---|---|---|
| 10,991,994 B2* | 4/2021 | Cho | B60L 58/10 |
| 2018/0234921 A1* | 8/2018 | Huang | H04W 52/0235 |
| 2019/0287549 A1* | 9/2019 | Poulsen | G10L 21/055 |
| 2020/0236494 A1* | 7/2020 | Ronan | H04L 12/403 |
| 2020/0295957 A1* | 9/2020 | Kim | H04L 41/0803 |
| 2021/0167688 A1* | 6/2021 | Hureau | H02M 3/1584 |
| 2021/0176013 A1* | 6/2021 | Ali | H04L 1/1877 |
| 2021/0204212 A1* | 7/2021 | Kumar | H04W 52/0229 |
| 2021/0357344 A1* | 11/2021 | Rennig | H04L 43/55 |
| 2022/0085919 A1* | 3/2022 | Komoriya | H04W 28/06 |
| 2024/0188178 A1* | 6/2024 | Fehrenbach | H04W 52/0216 |

FOREIGN PATENT DOCUMENTS

EP 2891581 A1 * 7/2015 ........... B60R 16/023

* cited by examiner

*Primary Examiner* — Brian D Nguyen

(57) ABSTRACT

Systems and methods are described for a slave PHY device retransmitting a waking up command to a master PHY device in a low-power mode. After transmitting a wake-up command to the master PHY device, the slave PHY device starts a timer. If the timer reaches a threshold time, the slave device retransmits the wake-up command.

20 Claims, 3 Drawing Sheets

AUTOMATIC RESENDING OF WUP BY SLAVE DEVICE

CROSS REFERENCE TO RELATED APPLICATION

This disclosure claims the benefit of commonly-assigned U.S. Provisional Patent Application No. 63/172,080, filed Apr. 7, 2021, which is hereby incorporated by reference herein in its entirety.

FIELD OF USE

This disclosure is related generally to communication networks and, more particularly, to automatic resending of wake-up commands transmitted from a slave device.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

It is desirable for devices in an Ethernet network to enter a low-power mode to conserve power consumption and improve the overall efficiency of the network. One approach to conserve power has been to keep these devices in the low-power mode and periodically wake up the device by sending a wake-up signal when the device is needed. In the current wake/sleep function defined by the OPEN Alliance TC10 (OA TC10), the wake-up pulse (WUP) is a 1 ms PAM2 or PAM3 waveform sent from one physical layer transceiver (PHY) to another to wake up the receiving PHY and eventually establish the link.

In some implementations, PHYs using Ethernet communication may be called upon to operate in severely constrained environments, such as automotive and industrial environments in which certain requirements (e.g., electromagnetic compatibility and temperature requirements) must be met. These environments may lead to the WUP being corrupted by environmental noise, especially in an automotive application. If an IEEE 802.3bw slave PHY device sends out a WUP, but the command is missed by the link partner, the slave will remain silent because typically there is no further action to wake up the link partner and bring the link up.

SUMMARY

Implementations described herein provide an apparatus and method for waking up a master PHY from a low-power mode, the master PHY being disposed in a network including at least the master PHY and a slave PHY, the master and slave PHYs being coupled via a communication link. The method includes transmitting a wake-up command to the master PHY from the slave PHY. In response to transmitting the wake-up command to the master PHY from the slave PHY, starting a first timer. In response to determining that the first timer has a value that is greater than a first threshold time, retransmitting the wake-up command to the master PHY from the slave PHY.

In some implementations, the slave PHY may monitor the communication link for a transmission from the master PHY. Upon determining that the first timer has run, without the slave PHY receiving a transmission from the master PHY, for a duration greater than the first threshold time, comparing the value of the first timer with the first threshold time.

In some implementations, in response to transmitting the wake-up command to the master PHY from the slave PHY, the slave may increment a counter. The slave may determine that the counter has a value that is greater than a counter threshold.

In some implementations, in response to determining that the counter has a value that is greater than a counter threshold, the slave PHY may prevent further transmissions of wake-up commands.

In some implementations, in response to retransmitting the wake-up command to the master PHY from the slave PHY, the slave PHY may start a second timer. After determining that the second timer has a value that is greater than a second threshold time the slave PHY may again retransmit the wake-up command to the master PHY.

In some implementations, the second timer has a value that is greater than the second threshold time that is equal to the first threshold time. In some implementations, the second timer has a value that is greater than the second threshold time different the first threshold time.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
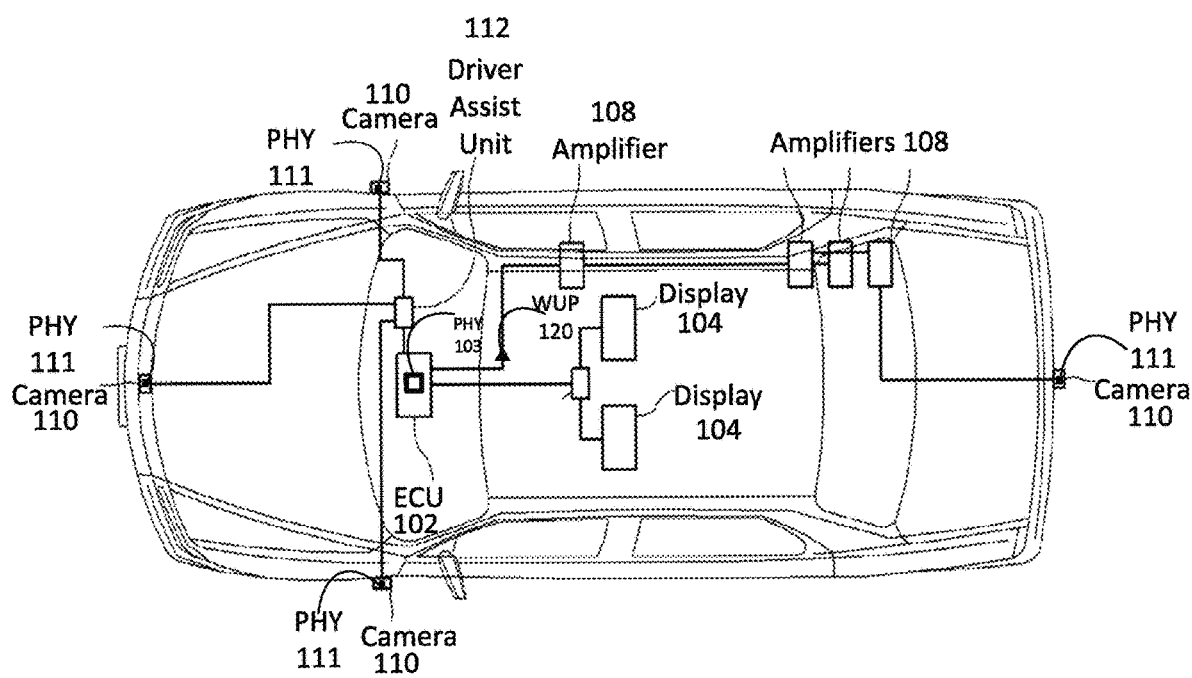
FIG. 1 is a block diagram illustrating an automotive environment having a number of PHYs which may incorporate implementations of the subject matter of this disclosure.

As noted above, it is desirable for devices in an Ethernet network to enter a low-power mode to reduce power consumption and improve the overall efficiency of the network. By way of example only, the various devices may be different devices in an automobile (not shown), such as an engine control unit, an infotainment unit, speakers, displays, sensors (e.g., a back-up camera, RADAR, LIDAR, temperature sensors), etc. One approach to conserve power has been to keep these devices in the low-power mode and to periodically wake up the device by sending a wake-up signal when the device is needed. In the typical wake/sleep function defined by the TC10 specification of the OPEN Alliance Special Interest Group, of Beaverton, Oregon, USA (OA TC10), the wake-up pulse (WUP) is a 1 ms PAM3 waveform sent from one physical layer transceiver (PHY) to a link partner to wake up the link partner and eventually establish the link.

In some implementations, PHYs using Ethernet communication may be called upon to operate in severely constrained environments, such as automotive and industrial environments in which certain requirements (e.g., electromagnetic compatibility and temperature requirements) must be met. These environments may lead to the WUP being corrupted by environmental noise, especially in an automotive application. In a typical wake-up procedure, the device configured to act as the master device initiates the wake-up procedure by sending the WUP to the slave device in low power mode. If the WUP is corrupted and/or not received by the slave device, the master device will be aware of the failure of the WUP because it will not receive further signals from the slave device. For example, an electronic control unit (ECU) with a PHY configured to act as a master device would send a WUP to a camera with a PHY configured to act as a slave device. If the WUP is corrupted or no received by the slave PHY of the camera, then the master PHY of the ECU will detect that the slave device was not woken up. However, sometimes a slave device may need to send a WUP to the master device. For example, if a PHY configured to act as a slave device operating according to the IEEE 802.3bw standard sends out a WUP, but the command is missed by the link partner configured to act as a master device, the slave PHY will remain silent. There is no further action to wake up the link partner and bring the link up.

Waking up a link partner when the WUP originates from a slave PHY presents a challenge in severely constrained environments, such as automotive and industrial environments. Specifically, when a slave PHY sends a WUP to a link partner, there is no mechanism for the slave PHY to determine if the link partner successfully received the WUP and if the link was established. In an environment where the master PHY sends a WUP to a slave PHY, the master will also send link training instructions to the slave PHY which will establish the link and detect if the slave PHY is not responding. However, slave PHYs do not send link training instructions and therefore do not check if the link partner received the WUP and began the training process. The slave PHY can only detect if the master has sent link training instructions back. It is necessary for slave devices to be able to detect a failure of the WUP it sends out. For example, if the PHY in the ECU is configured to act as a slave PHY and the PHY in the camera is configured to act as a master device, the ECU would still need to wake up the camera.

Accordingly, there is a need for a mechanism to detect 1) whether a WUP sent from a slave PHY was successfully received by a link partner and 2) whether link training was initiated, and then to resend the WUP if the previous WUP was unsuccessful.

In accordance with implementations of the subject matter of this disclosure, a slave device is configured to transmit a WUP to a master device over a fixed communication link connecting the two devices. Once the WUP has been transmitted, the slave device starts a timer. If the timer runs until it reaches a threshold time without having received a signal from the master device to begin establishing link training, the slave device retransmits the WUP. The threshold time may be preconfigured based on how long the device expects to wait before receiving a signal from the master device. In some implementations, the slave PHY contains a timer which begins when the slave PHY transmits the WUP to the master PHY. The slave PHY may be configured with a first threshold time at which point the WUP would be considered to have failed. The slave PHY monitors the communication link for a transmission from the master PHY. Upon determining that the timer at the slave PHY has run, without the slave PHY having received a transmission from the master PHY, for a duration greater than the first threshold time, the WUP is retransmitted. The slave device monitors the communication link for a signal to begin link training. Receiving this signal indicates to the slave device that the WUP it transmitted was successfully received by the master device. The mechanism for retransmitting the WUP upon determining that link training instructions were not received within a threshold time gives the slave PHY recourse for when a WUP was unsuccessful.

The master device and slave device may be part of a larger system or network including additional PHYs that communicate with the master device and slave device. The wakeup pulse transmitted by the slave device may be intended for just the master device or multiple devices in the network. The slave device may then monitor the communication links to each of the PHYs for transmissions. Upon determining that the timer has run, without the slave PHY having received a transmission from one or more of the PHYs in the network, for a duration greater than the first threshold time, the WUP is retransmitted. In some implementations, the WUP may be retransmitted to the PHYs which did not send a signal. In some implementations, the WUP may be retransmitted to all PHYs in the network.

Figure 2:
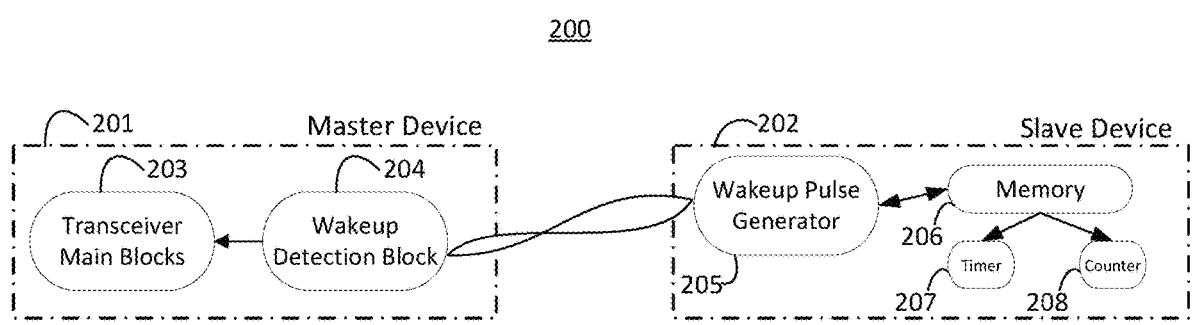
FIG. 2 is a high-level block diagram of two PHYs, one configured to act as a master device and one configured to act as a slave device, with which implementations of the subject matter of this disclosure may be used.
Figure 3:
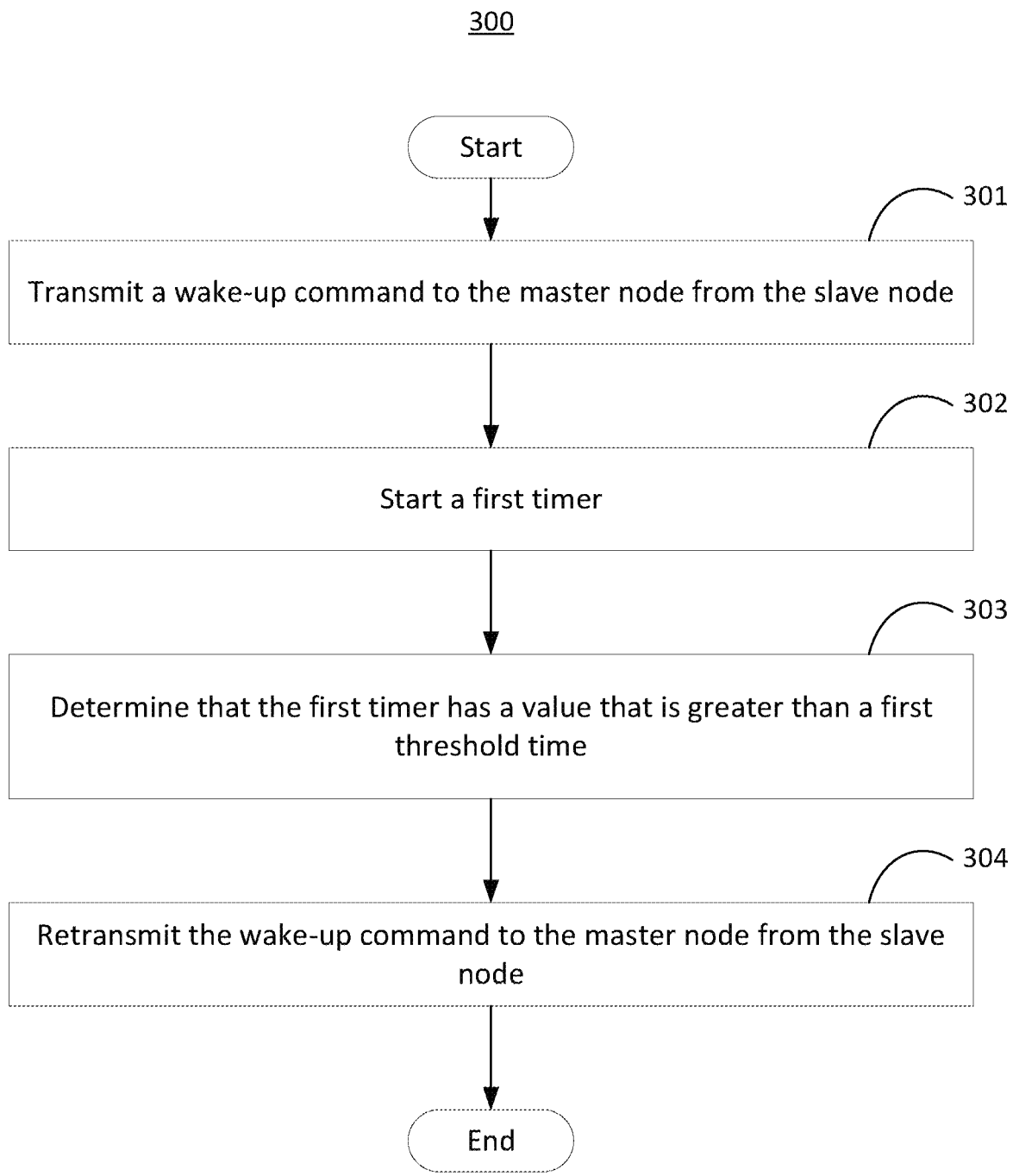
FIG. 3 is a flow diagram illustrating a method according to implementations of the subject matter of this disclosure for retransmitting a WUP to a master device from a slave device.

The subject matter of this disclosure will be better understood by reference to FIGS. 1-3.

FIG. 1 is a block diagram illustrating an automotive environment having a number of devices coupled to PHYs which may incorporate implementations of the subject matter of this disclosure, according to some implementations described herein, although the subject matter of this disclosure is not limited to automotive environments and may be implemented in similar architectures such as industrial networks. In the implementation shown in FIG. 1, the automotive network 100 includes multiple components linked to the network by PHYs including an Electronic Control Unit (ECU) 102, and multiple devices including displays 104, amplifiers 108, cameras 110, and a Driver Assist Unit 112). The ECU is connected to the various devices over a multi-gig Ethernet backbone using a single pair of light weight cables. There may be multiple ECUs serving different components in a domain-based architecture. Any of these devices may be configured to act as either a master or slave device. In some implementations, PHY 103 associated with ECU 102 may be configured to act as a slave device which may establish a communication link with PHYs 111 associated with cameras 110 acting as master devices. Any number of PHYs can be included within the automotive network 100 of FIG. 1 in different implementations. Additional components of the device and PHYs are discussed in greater detail below in connection with FIG. 2.

In accordance with implementations of the subject matter of this disclosure, a slave device may transmit a WUP to a master device which instructs the master device to exit a low-power mode and enter a wake mode. The master device should begin link training upon receipt of the WUP to establish the communication link between the master and slave devices. In some implementations, PHYs 111 associated with cameras 110 may be configured to act as master devices which may establish a communication link with PHY 103 associated with ECU 102 acting as a slave device. When waking up master PHYs 111 associated with cameras 110 from a low-power mode, PHY 103 associated with ECU 102 generates WUP 120 and transmits it to PHYs 11 associated with cameras 110.

FIG. 2 is a high-level block diagram of two PHYs, one configured to act as a master device and one configured to act as a slave device, with which implementations of the subject matter of this disclosure may be used. As shown in FIG. 2, a master device 201 includes transceiver main blocks 203 and a wake-up detection block 204. A slave device 202 includes a wake-up pulse generator 205, memory 206, and timer 207, and counter 208.

Slave device 202 includes wake-up pulse generator 205 to create a WUP to be transmitted to the master device 201. In accordance with an implementation of the subject matter of this disclosure, slave device 202 is connected to master device 201 by a single twisted pair cable, which may be shielded or unshielded, although other types of cabling (e.g., coaxial cable) may be used without departing from the subject matter of this disclosure.

Master device 201 to be awakened includes a wakeup detection block 204. In accordance with an embodiment of the subject matter of this disclosure, slave device 202 is connected to slave device 202 by a single twisted pair cable, which may be shielded or unshielded, although other types of cabling (e.g., coaxial cable) may be used without departing from the subject matter of this disclosure.

Slave device 202 transmits a WUP to master device 201. In some implementations, the WUP is a PAM3 waveform with a period of 1 ms. Within master device 201, wakeup detection block 204 communicates with the transceiver main blocks 203. When a WUP is received by wakeup detection block 204, the transceiver main blocks 203 begin the process of link training to establish a communication link with slave device 202. However, if wakeup detection block 204 does not receive the WUP, link training is not initiated.

Slave device 202 transmits the WUP via the wakeup pulse generator 205. When wakeup pulse generator 205 transmits the WUP, it communicates with memory 206 to start timer 207. Slave device 202 monitors the communication link for transmission from master device 201. If this timer reaches a time threshold stored in memory 206, wakeup pulse generator 205 will retransmit the WUP to master device 201.

In some implementations, when slave device 202 retransmits the WUP to master device 201, a second timer is started. This second timer is compared with a second time threshold, and when the second timer reaches the second time threshold, the slave device may again retransmit the WUP to the master device. In some implementations, this second time threshold may have a value that is equal to the first time threshold. In some implementations, this second time threshold may have a value that is different for the first time threshold.

In some implementations, when slave device 202 transmits the WUP, counter 208 stored by memory 206 may be incremented. This counter may be compared with a counter threshold. If the counter is determined to have a value greater than the counter threshold, the slave device may cease retransmitting the WUP. This counter prevents an infinite loop in the case that there is a critical failure in the link between slave device 202 and master device 201.

FIG. 3 is a flow diagram illustrating a method according to implementations of the subject matter of this disclosure for retransmitting a WUP to a master device from a slave device as described above.

At 301, a wake-up command is transmitted from the slave PHY to the master PHY. At 302, a first timer is started at the slave device. The timer reaches a threshold time at 303, which prompts the slave device 304 to retransmit the slave device at 304.

Thus it is seen that a method for retransmitting a WUP from a slave PHY has been provided. By monitoring the communication link for a signal to begin link training after transmitting a WUP, the slave device can determine if the WUP it transmitted was successfully received by the master device. The mechanism for retransmitting the WUP upon determining that link training instructions were not received within a threshold time gives the slave PHY recourse for when a WUP was unsuccessful.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for waking up a master PHY from a low-power mode, the master PHY being disposed in a network including at least the master PHY and a slave PHY, the master and slave PHYs being coupled via a communication link, the method comprising:
   transmitting a wake-up command to the master PHY from the slave PHY;
   in response to transmitting the wake-up command to the master PHY from the slave PHY, starting a first timer;
   monitoring the communication link at the slave PHY for a transmission, from the master PHY, that includes a signal to begin link training;
   determining, based on monitoring the communication link, that the first timer has a value that is greater than a first threshold time;
   determining, based on the first timer having a value that is greater than the first threshold time, that no transmission that includes a signal to begin link training was received by the slave PHY;
   in response to determining that no transmission that includes a signal to begin link training was received by the slave PHY, retransmitting the wake-up command to the master PHY from the slave PHY.

2. The method of claim 1 further comprising:
   determining that the first timer has run, without the slave PHY receiving a transmission, from the master PHY, that includes a signal to begin link training for a duration greater than the first threshold time; and
   based on determining that no transmission that includes a signal to begin link training was received by the slave PHY, comparing the value of the first timer with the first threshold time.

3. The method of claim 1 further comprising:
   in response to transmitting the wake-up command to the master PHY from the slave PHY, incrementing a counter at the slave;
   determining that the counter has a value that is greater than a counter threshold.

4. The method of claim 3 further comprising:
   in response to determining that the counter has a value that is greater than a counter threshold, preventing further transmissions of wake-up commands.

5. The method of claim 1, further comprising:
   in response to retransmitting the wake-up command to the master PHY from the slave PHY, starting a second timer;
   determining that the second timer has a value that is greater than a second threshold time;
   in response to determining that the second timer has a value that is greater than a second threshold time, again retransmitting the wake-up command to the master PHY from the slave PHY.

6. The method of claim 5 further comprising determining that the second timer has a value that is greater than the second threshold time that is equal to the first threshold time.

7. The method of claim 5 further comprising determining that the second timer has a value that is greater than the second threshold time different the first threshold time.

8. A slave PHY in a network configured to wake up a master PHY from a low-power mode, the slave PHY comprising:
input/output (I/O) circuitry configured to:
transmit a wake-up command to the master PHY in the network coupled to the slave PHY via a communication link; and
processing circuitry configured to:
in response to the I/O circuitry transmitting a wake-up command to the master PHY in the network coupled to the slave PHY via the communication link, start a first timer;
monitor the communication link for a transmission, from the master PHY, that includes a signal to begin link training;
determine, based on monitoring the communication link, that the first timer has a value that is greater than a first threshold time;
determine, based on the first timer having a value that is greater than the first threshold time, that no transmission that includes a signal to begin link training was received by the slave PHY; and
in response to determining that no transmission that includes a signal to begin link training was received by the slave PHY, retransmit the wake-up command to the master PHY using the I/O circuitry.

9. The slave PHY of claim 8, wherein the processing circuitry is further configured to:
determine that the first timer has run, without receiving a transmission, from the master PHY, that includes a signal to begin link training for a duration greater than the first threshold time;
based on determining that no transmission that includes a signal to begin link training was received, comparing the value of the first timer with the first threshold time.

10. The slave PHY of claim 8, wherein the processing circuitry is incapable of establishing the communication link.

11. The slave PHY of claim 8, wherein the processing circuitry is further configured to:
in response to transmitting the wake-up command to the master PHY, increment a counter;
determine that the counter has a value that is greater than a counter threshold.

12. The slave PHY of claim 11, wherein the processing circuitry is further configured to:
in response to determining that the counter has a value that is greater than a counter threshold, prevent further transmissions of wake-up commands.

13. The slave PHY of claim 8, the processing circuitry further configured to:
in response to retransmitting the wake-up command to the master PHY using the I/O circuitry, start a second timer;
determine that the second timer has a value that is greater than a second threshold time; and
in response to determining that the second timer has a value that is greater than a second threshold time, again retransmit the wake-up command to the master PHY using the I/O circuitry.

14. The slave PHY of claim 13, wherein the processing circuitry is configured to determine that the second timer has a value that is greater than a second threshold time equal to the first threshold time.

15. The slave PHY of claim 13, wherein the processing circuitry is configured to determine that the second timer has a value that is greater than a second threshold time different from the first threshold time.

16. A system for waking up a master PHY from a low-power mode, the system comprising:
a master PHY;
a slave PHY configured to:
transmit, to the master PHY via a communication link, a wake-up command;
in response to transmitting the wake-up command, start a timer;
monitor the communication link for a transmission, from the master PHY, that includes a signal to begin link training;
determine, based on monitoring the communication link, that the timer has a value that is greater than a threshold time;
determine, based on the first timer having a value that is greater than the first threshold time, that no transmission that includes a signal to begin link training was received; and
in response to determining that no transmission that includes a signal to begin link training was received, retransmit, to the master PHY, the wake-up command.

17. The system of claim 16, wherein the slave PHY is incapable of establishing the communication link between the master and slave PHY.

18. The system of claim 16, wherein the slave PHY is further configured to:
based on determining that no transmission that includes a signal to begin link training was received, compare the value of the first timer with the first threshold time.

19. The system of claim 16, wherein the slave PHY is further configured to:
in response to transmitting, to the master PHY via a communication link, a wake-up command, increment a counter;
determine that the counter has a value that is greater than a counter threshold.

20. The system of claim 16, wherein the slave PHY is further configured to:
in response to determining that the counter has a value that is greater than a counter threshold, prevent further transmissions of wake-up commands.

* * * * *